(No Model.)

M. HODGSON.
FEED BOX FOR MANGERS.

No. 554,779. Patented Feb. 18, 1896.

Witnesses.
Geo. A. Camblin
Chas. M. Einfeldt

Inventor:
Mark Hodgson

UNITED STATES PATENT OFFICE.

MARK HODGSON, OF DENVER, COLORADO.

FEED-BOX FOR MANGERS.

SPECIFICATION forming part of Letters Patent No. 554,779, dated February 18, 1896.

Application filed February 18, 1895. Serial No. 538,893. (No model.)

*To all whom it may concern:*

Be it known that I, MARK HODGSON, a citizen of the United States, residing at Denver, in the county of Arapahoe and State of Colorado, have invented a new and useful Feed-Box for Feeding Horses or other Animals, of which the following is a specification.

My invention relates to improvements in feed-boxes from which horses or other animals are fed; and the objects of my improvement are, first, to feed animals automatically and at a fixed time, so that the animal to be fed will not suffer from neglect of the attendant; second, in order that the condition of the animal thus served may be improved by his being fed at regular times and when in proper condition to receive food, it being a well-known fact that horses coming in from work are very frequently fed when too warm, because the driver or attendant does not, and often cannot, wait until the animals are sufficiently cooled before giving them food, and from the same cause the horse is very often fed so late in the morning that he has not sufficient time in which to masticate and digest his food.

By the use of my improvement the horse or other animal can be fed without fail at the proper time, whether an attendant is present or not.

My invention is not designed to enable an attendant to feed simultaneously from a single point a large number of horses, cattle, or other animals kept in separate stalls or pens and having separate feed-boxes. I am aware that a number of such devices have been invented, but they are evidently intended to be fixtures—permanent—and are made automatic by the addition of a complete clock. Again, to change the time of feeding a readjustment of their working parts is required. Such machines, evidently, are intended for large establishments and not for general domestic use, where only a few animals are kept.

My improvement is self-contained, to wit: A few wheels are geared and are attached to and are inclosed within and constitute a part of the feed-box itself, and the box being portable can be removed to any stall or other place where an automatic time-feed box is required, with the additional novelty and advantage that no readjustment of its working parts is necessary to feed at different times, but it will provide the feed in a limited number of hours, or in a limited number of minutes, as the weight is raised a greater or lesser distance, thus filling a general domestic necessity not provided for in any other of the inventions referred to.

I attain these objects by the mechanism illustrated in the accompanying drawings, in which—

Figure 1 is a front view of the feed-box. The dotted lines A represent the lid when open. B shows the position of the time-gearing, which is placed in a side section of the feed-box. C is the weight, supported by the cord R, which in descending presses on the point of the lever D, forcing it down and drawing the antifriction-roller K from supporting the hinged bottom, allowing the bottom to open and the feed to pass out. Dotted lines E represent the bottom when open. K is the antifriction-roller in the end of the lever. L is the pin, fitted in the bracket, supporting the lever, and on which it works.

Fig. 2 is a cross-section of the feed-box through the lever. E is the bottom of the box when resting on the lever. The dotted lines E show the position of the bottom when open. L is the pin supporting the lever, and upon which it works. O is the bracket holding the pin which supports the lever. Dotted lines A show the top of the box when open.

Similar letters refer to similar parts throughout the several views.

Figure 1:
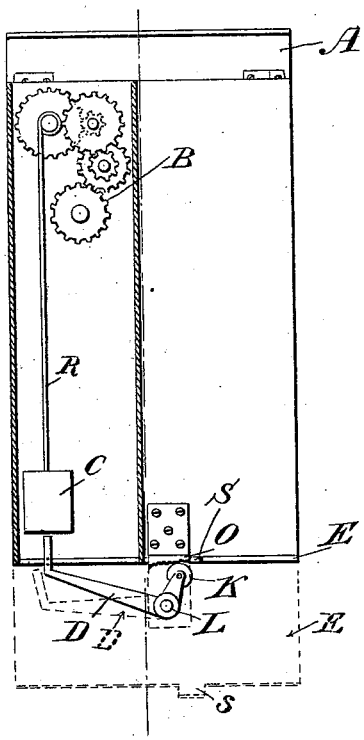
Figure 2:
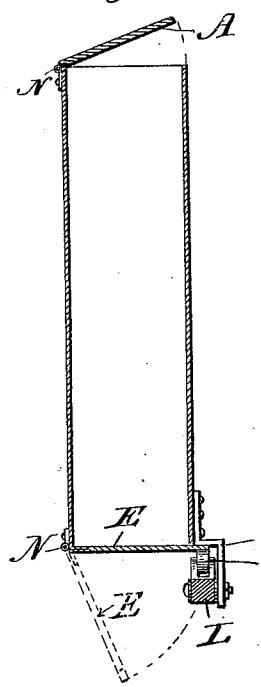
Figure 3:
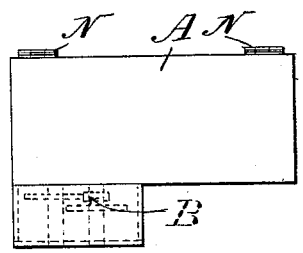
Fig. 3 is a plan of the top of the box, in which B is the section holding the time-gearing.
Figure 6:
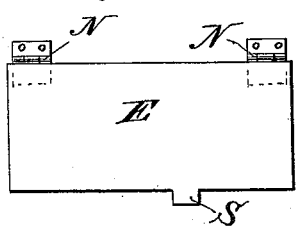
Fig. 6 is the bottom of the box, showing the projection S and the hinges N N.
Figure 4:
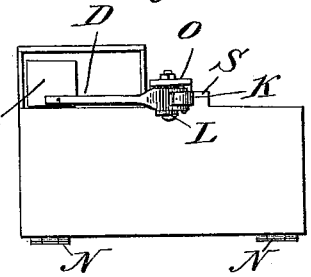
Fig. 4 is a plan of the bottom of the box, showing the lever D in the section containing the time-gearing. Dotted lines S designate the projection of the bottom of the box removed, exposing to view the end of the lever supporting the bottom of the box when closed.
Figure 5:
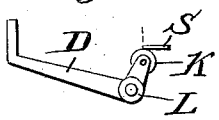
Fig. 5 is a horizontal view of the lever, showing the projection S of the bottom of the box resting on the antifriction-roller K.

To operate the feed-box the bottom is closed and the grain or feed is placed in the box and the top is closed. The time-gearing is then wound up, raising the weight a sufficient height, so that at the end of the time fixed to lower the weight sufficiently to act on the lever by pressing it down the bottom of the box will be released and the feed allowed to pass out at the required time.

I am aware that prior to my invention automatic stock-feeding devices have been invented for the purpose of feeding simultaneously a number of animals at a given time, such devices being fixtures and their operating parts being separated and not inclosed in a receptacle. I therefore do not claim such a device broadly; but What I do claim as my invention, and desire to secure by Letters Patent, is—

In a device for automatically feeding stock the combination with a box having a hinged bottom, of a pivoted lever provided at one end with a roller for supporting said hinged bottom, a falling weight and time-gearing operating the same whereby said lever is tripped to release said hinged bottom, all substantially as set forth.

MARK HODGSON.

Witnesses:
CHAS. M. EINFELDT,
GEO. A. CAMBLIN.